(12) United States Patent
Shelby et al.

(10) Patent No.: US 7,302,932 B2
(45) Date of Patent: Dec. 4, 2007

(54) PRE-IGNITION DETECTION AND MITIGATION

(75) Inventors: Michael Howard Shelby, Dearborn Heights, MI (US); Robert A. Stein, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/378,672

(22) Filed: Mar. 17, 2006

(65) Prior Publication Data

US 2007/0215107 A1    Sep. 20, 2007

(51) Int. Cl.
*F02P 5/15* (2006.01)

(52) U.S. Cl. .................. 123/406.26; 123/406.47; 123/481; 73/35.09; 701/111

(58) Field of Classification Search ........... 123/406.26, 123/406.28, 406.45, 406.47, 481; 73/35.09; 701/111
See application file for complete search history.

(56) References Cited

U.S. PATENT DOCUMENTS

| | | | |
|---|---|---|---|
| 4,648,367 A | | 3/1987 | Gillbrand et al. |
| 5,080,068 A | * | 1/1992 | Sawamoto ............... 123/481 |
| 5,204,630 A | | 4/1993 | Seitz et al. |
| 5,632,247 A | * | 5/1997 | Hashizume et al. ... 123/406.26 |
| 5,905,193 A | * | 5/1999 | Hashizume et al. ....... 73/35.09 |
| 6,883,497 B2 | * | 4/2005 | Wozniak et al. ....... 123/406.26 |
| 7,178,503 B1 | * | 2/2007 | Brehob ....................... 123/304 |
| 2004/0083717 A1 | | 5/2004 | Zhu et al. |

OTHER PUBLICATIONS

Rado, et al., "Significance of Burn Types, as Measured by Using the Spark Plugs as Ionization Probes, with Respect to the Hydrocarbon Emission Levels in S.I. Engine", SAE 750354, Feb. 24-28, 1975.
D.R. Cohn et al., "Direct Injection Ethanol Boosted Gasoline Engines: Biofuel Leveraging for Cost Effective Reduction of Oil Dependence and CO2 Emissions", Mar. 15, 2005, Massachusetts Institute of Technology.
L. Bromberg et al., "Calculations of Knock Suppression in Highly Turbocharged Gasoline/Ethanol Engines Using Direct Ethanol Injection", Jul. 7, 2005, Massachusetts Institute of Technology.

* cited by examiner

*Primary Examiner*—T. M. Argenbright
(74) *Attorney, Agent, or Firm*—Allan J. Lippa; Alleman Hall McCoy Russell & Tuttle LLP

(57) ABSTRACT

A system and method for detecting and mitigating preignition for a multi-cylinder engine is provided. According to one aspect of the disclosure, a method is provided including identifying a preignition event at an affected cylinder; deactivating the affected cylinder during a deactivation period; initiating an accommodation system for one or more unaffected cylinders; and activating an indicator system.

20 Claims, 3 Drawing Sheets

PRE-IGNITION DETECTION AND MITIGATION

FIELD

The present disclosure is directed toward a system and method for detecting and mitigating pre-ignition.

BACKGROUND AND SUMMARY

Operation of an engine may be improved by providing detection and error-mitigation systems. Various systems have been developed to attempt to detect negative engine conditions. Some of these systems are completed only through service diagnostic testing. Further some systems only detect the engine degradation condition after the engine degradation event has occurred. Moreover, many of these systems do not provide a mitigation strategy to fully address and compensate for the detected engine condition.

As an example, preignition is an engine degradation event which may have substantial negative effects on engines. Preignition generally is in-cylinder combustion initiated prior to activating the spark plug and may result in extremely high cylinder pressures and temperatures. The high pressures and temperatures may result in damage to the engine. For example, in-use engine degradation may be attributed to preignition. Moreover, preignition may affect engine durability. To avoid or reduce the dangers of preignition, engines may be designed to accommodate potential engine damage due to preignition. Such designs may prevent the engine from being designed to optimize engine performance, e.g., by increasing engine size, weight, material costs, etc.

The inventors herein have recognized that without the ability to detect and mitigate preignition, the fuel economy and performance of the engine may be compromised to insure some margin of safety from preignition. Adopting preignition detection and providing effective mitigation of such preignition may reduce in-use engine degradation. Further, preignition detection and mitigation may facilitate design and calibration of engines closer to optimum performance.

Therefore, in one approach, a system and method may be provided which mitigates the effects of preignition by using spark plug ionization detection to detect preignition on a cycle-by-cycle basis for each cylinder. Once pre-ignition has been detected, the engine control system can be programmed to avoid or reduce engine damage by: 1) deactivating the fuel injector on the cylinder in which preignition was detected (while continuing operation of remaining fuel injectors); 2) retarding spark (and/or adding additional fuel enrichment) for the remaining firing cylinders preventing additional cylinders from entering preignition; 3) activating a user indicator system; and 4) after a period, reactivating the injector for the cylinder in which the preignition was detected.

DETAILED DESCRIPTION

Figure 1:
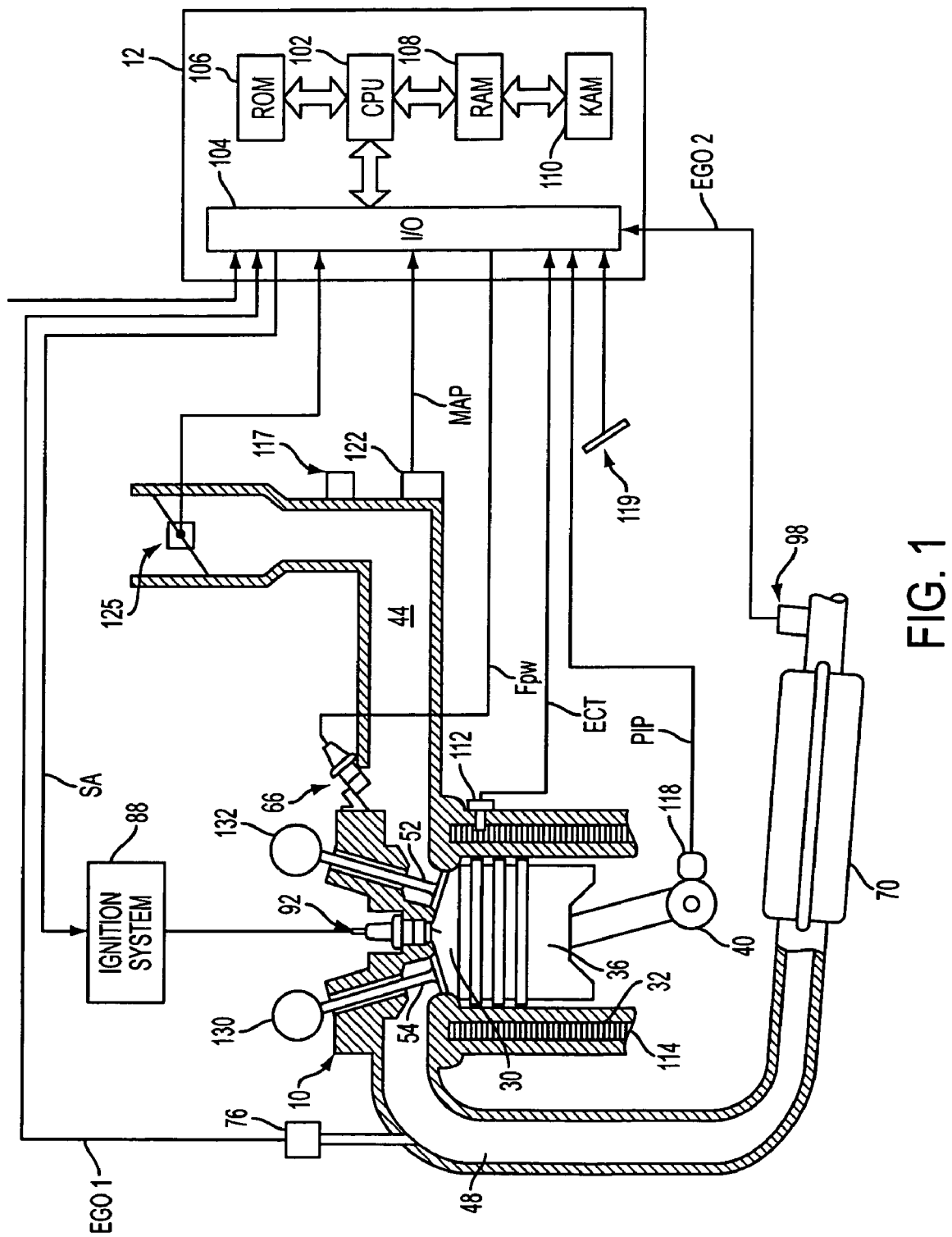
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 an exhaust valve 54. Each intake and exhaust valve may be operated by a common overhead camshaft (not shown), or each may be operated by separate overhead camshafts (130, 132). Alternatively, the valves may be actuated via a push rod configuration, for example. Further still, other valve configurations may also be used. In one example, the intake and/or exhaust camshafts may be configured to provide variable valve timing and/or variable valve lift operation. Alternatively, fixed timing and/or lift configurations may be used.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail. Alternatively, the engine may be configured such that the fuel is injected directly into the engine cylinder, which is known to those skilled in the art as direct injection. In addition, intake manifold 44 is shown communicating with optional electronic throttle 125.

Distributorless ignition system 88 provides ignition spark to combustion chamber 30 via spark plug 92 in response to controller 12. Exhaust Gas Oxygen (EGO) sensor 76 is shown coupled to exhaust manifold 48 upstream of catalytic converter 70, and providing signal EGO1. The sensor may be a HEGO, or UEGO type sensor, for example. Exhaust gas oxygen sensor 98 is also shown coupled to exhaust manifold 48 downstream of catalytic converter 70, and provides signal EGO2. Again, sensor 98 may be a UEGO, HEGO, or other type of oxygen sensor, for example.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, and read-only memory 106, random access memory 108, keep alive memory (KAM) 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined. The output of sensor 118 can be used to identify engine position.

In an alternative embodiment, a direct injection type engine can be used where injector 66 is positioned in combustion chamber 30, either in the cylinder head similar to spark plug 92, or on the side of the combustion chamber.

Also, the engine may be coupled to an electric motor/battery system in a hybrid vehicle. The hybrid vehicle may have a parallel configuration, series configuration, or variation or combinations thereof.

As described above, preignition may occur when charge in the combustion chamber 30 (shown in FIG. 1) is ignited prior to the spark event. Preignition spark may result in very high pressure and heat generation which may have negative effects on multi-cylinder internal combustion engines. For example, in-use engine degradation may be attributed to pre-ignition. Moreover, pre-ignition may affect engine durability. For example, preignition may result in a hole blown through a piston.

By detecting preignition and mitigating the effects of preignition, engine degradation may be prevented or reduce and engine durability improved. For example, in some embodiments, spark plug ionization detection may be used to detect preignition on a cycle-by-cycle basis for each cylinder. In one example, spark plug ionization signals may be used to monitor preignition. For example, an ion current may be introduced such that a measurable voltage is applied to the spark plug. The current flow across the spark plug may be monitored such that excess current flow from the base current flow results in identification of the preignition status of the spark plug. It should be noted that one preignition cycle may lead to an even earlier preignition cycle and result in increased damage to the engine. Early identification and shut down of a cylinder in a preignition status may reduce engine failure events.

Figure 2:
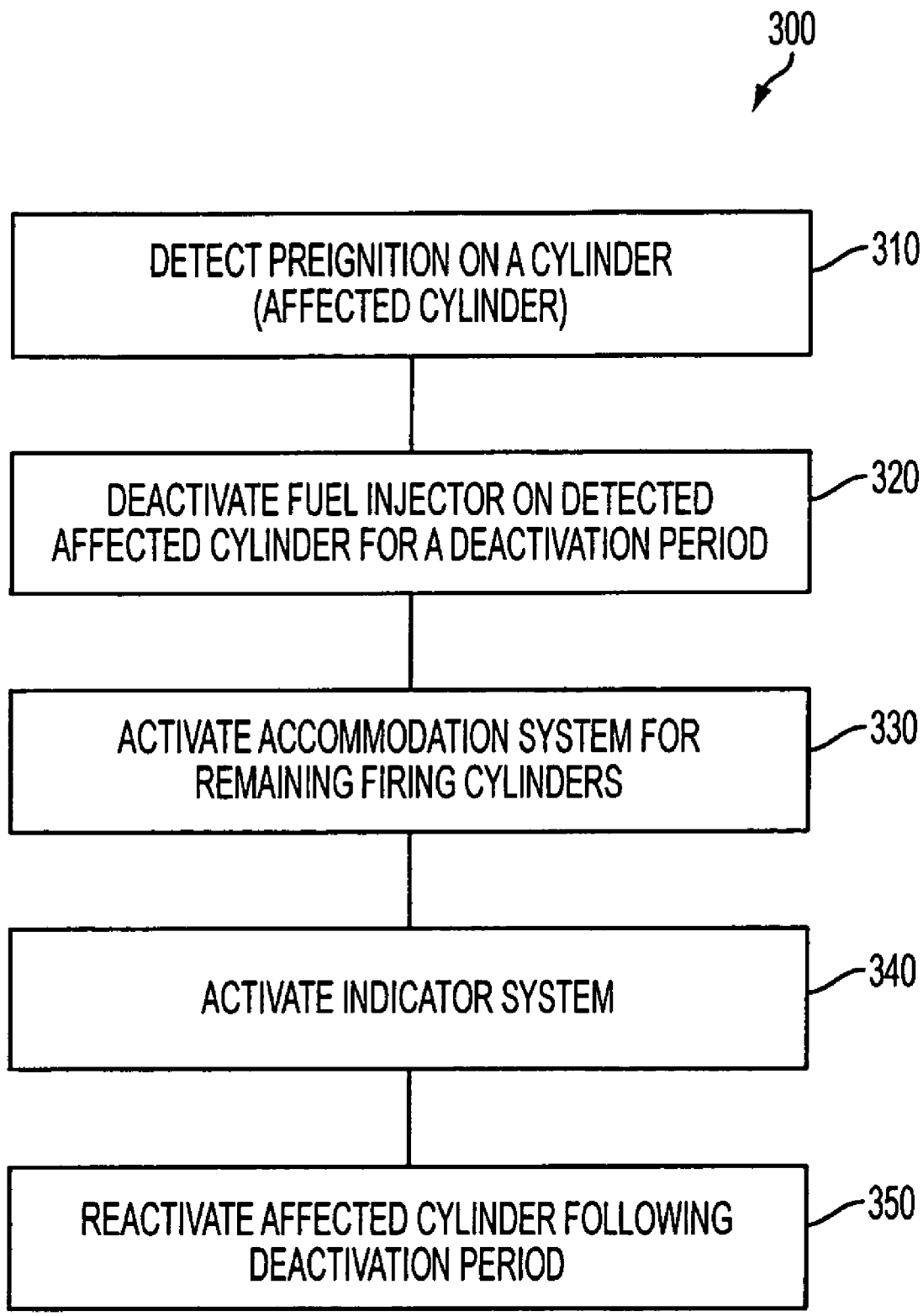
FIG. 2 is a flowchart of an example preignition detection and mitigation method.

Referring now to FIG. 2, a schematic illustration of a method of detecting and mitigating preignition using spark plug ion sensing is provided generally at 300. As described in more detail below, a multi-step mitigation system provides for a reduction in engine failure events. It should be appreciated that the routines described below in the flowcharts may represent one or more of any number of processing strategies, such as event-driving, interrupt-driven, multi-tasking, multi-threading, and the like. As such various steps of functions illustrated may be performed in the sequence illustrated, in parallel, or in some cases omitted. Likewise, the order of processing is not necessarily required to achieve the features and advantages of the invention, but is provided for ease of illustration and description. Although not explicitly illustrated, one of ordinary skill in the art will recognize that one or more of the illustrated steps or functions may be repeatedly performed depending on the particular strategy being used.

As shown in FIG. 2, first in 310, spark plug ionization detection may be used to detect pre-ignition on a cycle-by-cycle basis for each cylinder. Once preignition is detected, the routine proceeds to 320, where the system is configured to deactivate the fuel injector on the cylinder in which preignition was detected. Deactivation of the fuel injector operates to stop the preignition events and prevent damage to the identified preignition cylinder. As described in more detail below, the affected cylinder may be deactivated for a deactivation period. The deactivation period may be preset, e.g. based on time or cycles, and/or based on cylinder environment, e.g. surface temperature of the affected cylinder. Note that the above operation is just one example of deactivation that may be used. In an alternative embodiment, deactivating a cylinder may also include deactivating the intake and/or exhaust valves in addition to the fuel injector for a cylinder. Such operation may have the added benefit of not pumping excess air through the catalyst. For example, when the remaining operating cylinders are performing rich combustion, pumping excess air through the catalyst may cause an exothermic reaction which could overheat the catalyst. Thus, by using fuel and valve deactivation, improved operation may be achieved. The valve deactivation may be performed in various ways, such as with a variable displacement engine (where some or half of the engine cylinders have a deactivation mechanism), or with electrically actuated valves, for example.

In addition to deactivating the identified fuel injector, an accommodation system is initiated to shield the remaining firing cylinders from the preignition conditions at 330. For example, in some embodiments, the system retards the spark and/or adds fuel enrichment for the remaining firing cylinders. Such accommodation may prevent additional cylinders from entering a preignition status. Further, if pre-ignition is detected, a spark limit table as a function of engine speed, load, and coolant temperature, for example, could be updated in KAM to avoid pre-ignition the next time the same or similar conditions are encountered. In this way, adaptation may be used to improve longer term engine operation.

In some embodiments, the routine may continue at 340 where upon identification of one or more cylinders in a preignition status, a user indicator system or warning system may be activated. The user indicator system may include visual indicators and/or audible indicators and may provide operation status regarding the engine and/or cylinder. As an example, a malfunction indicator lamp (MIL) may be activated. The MIL may be visible to the user on a dashboard, a control panel or other user viewable region. The activation of such a system may provide an alert to the user that there may be an issue that could affect engine performance.

In some embodiments, additional indicators also may be provided such that service providers may easily detect and identify the source for activation of the warning or indicator system. Further, systems may provide memory to log pre-ignition events and mitigating routines as they occur.

Upon passage of a deactivation period, the routine may continue to 350, where the fuel injector of the preignition detected cylinder may be reactivated. The deactivation period may be based on one or more events, time or cycles. For example, the deactivation period may be determined based on preignition detection factors or on other system factors. For example, detection sensors may be provided to detect the surface temperature of the affected cylinder. Upon detection of a surface temperature below a threshold value, the fuel injector on the affected cylinder may be reactivated.

In some embodiments, reactivation may occur based on an average cooling period. Upon passage of the preset time period, reactivation of the fuel injector may occur. In addition, in some embodiments, a cycle period may be used for defining the period. Thus, after a number of engine cycles, the fuel injector of the affected cylinder may be reactivated. Reactivation of the fuel injector may restore normal engine function.

Use of the ion-sensing detection and mitigation method and system may reduce in-use engine degradation, including knocking, misfiring and preignition. Further, such detection and mitigation may facilitate designing and calibrating the engine closer to optimum performance as less safety margin is necessary with the detection and mitigation of preignition.

Figure 3:
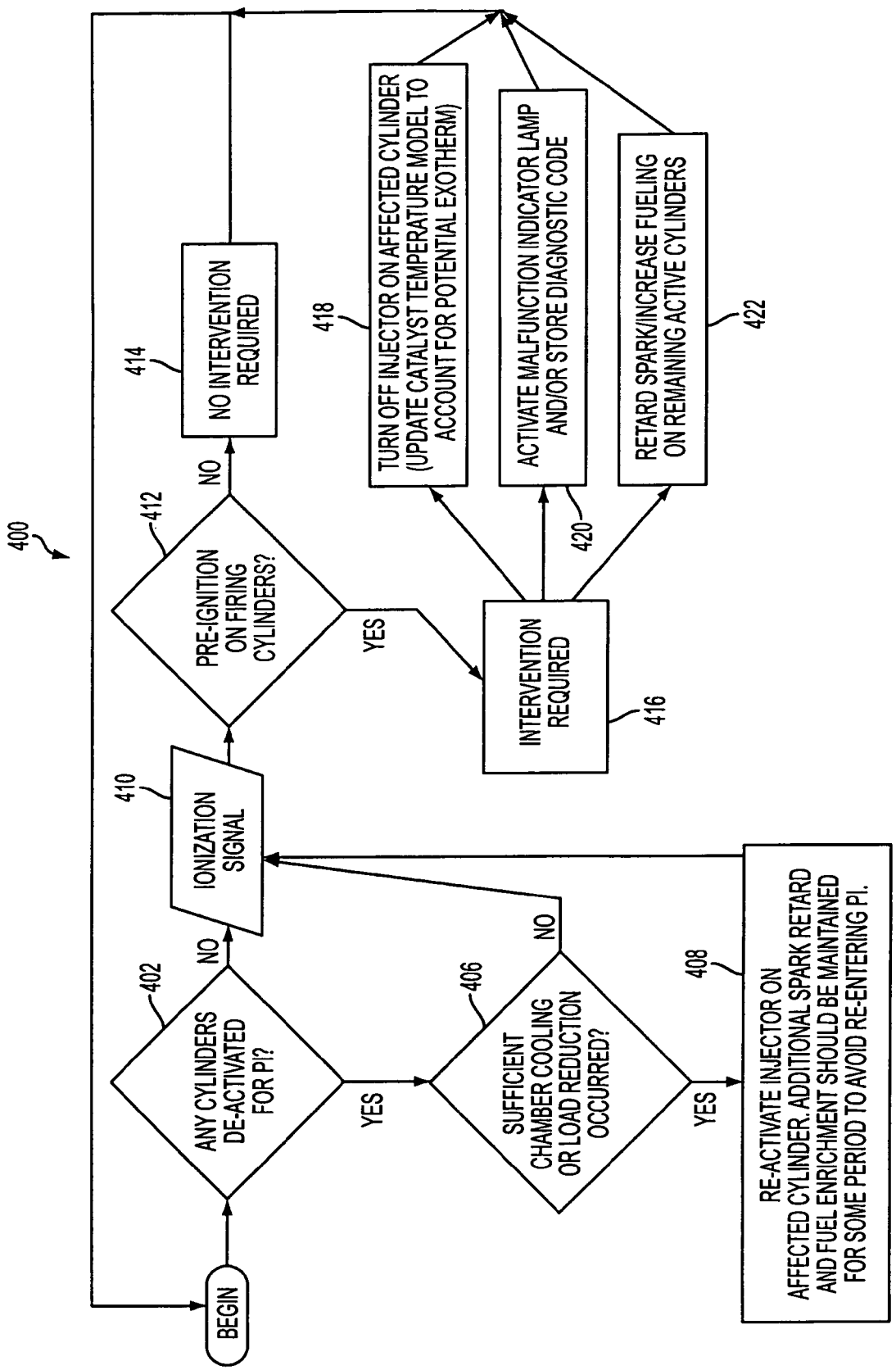
FIG. 3 is another flowchart of an example preignition detection and mitigation method.

FIG. 3 illustrates in more detail an exemplary preignition detection and mitigation system using spark plug ion sensing. First, in 402, the routine determines if any cylinders have been deactivated due to preignition status. If one or more cylinders is deactivated for preignition, then the routine determines, at 406, whether there has been sufficient chamber cooling and/or sufficient load reduction. If chamber cooling and/or load reduction has occurred sufficiently to address the preignition status of the cylinders then the fuel injector of the affected cylinder may be reactivated, at 408. It should be noted that in some embodiments additional spark retard and fuel enrichment may be maintained for some period of time or number of cycles to avoid the cylinder re-entering the preignition status.

Referring back to the determination of whether any cylinders have been deactivated for preignition, if no cylinders are deactivated for preignition, then an ionization signal may be introduced and monitored, at 410. Likewise, once sufficient chamber cooling and/or load reduction has occurred for a cylinder deactivated due to preignition status, than an ionization signal may be introduced and monitored, at 410.

In some embodiments, if sufficient chamber cooling and/or load reduction has not occurred, the fuel injector may not be reactivated from the affected cylinder. However, an ionization signal may be introduced and monitored for the activated cylinders.

The routine again continues, following introduction and monitoring of the ionization signal, with determining, at 412, whether preignition is occurring at any of the activated or firing cylinders. If no preignition status is detected on any of the firing cylinders, no intervention is required, at 414, and the routine may be restarted.

If preignition status is determined on one or more of the firing cylinders, system intervention may be initiated, at 416. Further, the combination mitigation steps provide a three-step mitigation process, although in other embodiments, any different number of steps may be provided. In the illustrated three-step mitigation process, the following general three steps are addressed: 1) intervention of the affected cylinder identified in a preignition status; 2) operation of an indicator system and 3) intervention of the remaining active cylinders.

For example, in the present embodiment, system intervention may include one or more of the following mitigation steps: deactivation of the fuel injector of the affected cylinder at 418; activation of a malfunction indicator lamp and/or storing of a diagnostic code and/or addressing the remaining active cylinders through retardation of spark and/or increasing fueling at 422. It should be appreciated that the above mitigation steps are for exemplary purposes and additional mitigation steps may be provided. Also at 418, the routine may adjust or update a catalyst temperature model to account for increased exothermic reactions caused by excess oxygen and unburned fuel or rich gasses in the exhaust.

Following the mitigation steps, the routine returns to determination of whether any cylinders deactivated due to preignition status at 402. If the system previously required intervention, at 416, then one or more of the fuel injectors on the affected cylinders may be deactivated per mitigation step 418. In such a situation and as described in more detail above, after determining the deactivated status on one more cylinders, it may be possible to determine based on any suitable system control factor, e.g. chamber cooling level or load reduction level, whether reactivation may be initiated, at 406 and 408.

Note that the above approach may be applied in a variety of system configurations, as noted. For example, the engine may be configured to operate with two different fuel types, such as with a port or direct injection of a hydrocarbon fuel (e.g. gasoline) and port or direct injection of an alcohol or alcohol/hydrocarbon/water mixture for a given cylinder. The alcohol may be ethanol, methanol, or combinations thereof, for example. As increasing use of alcohol may make pre-ignition more likely, the ratio of the hydrocarbon fuel may be increased if pre-ignition is detected while optionally deactivating injection of the alcohol/hydrocarbon/water mixture. Further, spark timing may be retarded as less alcohol/hydrocarbon/water mixture is used during such operation.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for preignition detection and mitigation for a multi-cylinder engine, the method comprising:
   identifying a preignition event at an affected cylinder;
   deactivating the affected cylinder during a deactivation period;
   initiating an accommodation system for one or more unaffected cylinders; and
   activating an indicator system.

2. The method of claim 1, wherein identifying a preignition event includes introduction of a spark plug ionization signal.

3. The method of claim 2, wherein identifying a preignition event includes monitoring the spark plug ionization signal to detect the preignition event.

4. The method of claim 1, wherein deactivating the affected cylinder includes deactivating a fuel injector of the affected cylinder.

5. The method of claim 1, wherein initiating an accommodation system for one or more unaffected cylinders includes retarding the spark of at least one of the unaffected cylinders.

6. The method of claim 1, wherein initiating an accommodation system for one or more unaffected cylinders includes adding fuel enrichment to at least one of the unaffected cylinders.

7. The method of claim 1, wherein activating an indicator system includes activating a user indicator system.

8. The method of claim 1, wherein deactivating the affected cylinder includes deactivating a fuel injector and at least one of an intake and exhaust valve of the affected cylinder.

9. The method of claim 1, further comprising reactivating the affected cylinder after the deactivation period.

10. The method of claim 1, wherein the deactivation period is a period of time.

11. The method of claim 1, wherein the deactivation period is a number of cycles.

12. The method of claim 1, wherein the deactivation period is based on cylinder environment.

13. The method of claim 12, further comprising monitoring a surface temperature of the affected cylinder, and determining the deactivation period based on the surface temperature of the affected cylinder, where the temperature is estimated or measured.

14. A preignition detection and mitigation system, comprising:
   a controller for monitoring a multi-cylinder engine;

a detection system for introducing and monitoring an ionization signal to determine preignition status of the cylinders;

a deactivation system for deactivating a cylinder detected in a preignition status;

an accommodation system for shielding active cylinders; and an indicator system.

15. The preignition detection and mitigation system of claim 14, wherein the deactivation system is configured to deactivate the cylinder in the preignition state for a deactivation period.

16. The preignition detection and mitigation system of claim 15, wherein the deactivation period is one of a period of time, number of cycles or a cylinder environment detection.

17. The preignition detection and mitigation system of claim 14, wherein the accommodation system is configured to retard the spark or add fuel enrichment to the active cylinders.

18. The preignition detection and mitigation system of claim 14, wherein the indicator system is configured to notify the user of an engine condition.

19. An automotive engine, comprising:

a plurality of cylinders;

a preignition detection system to detect preignition status of one of the cylinders; and a preignition mitigation system to reduce the effect of the preignition status on the engine by retarding spark timing and reducing an amount of alcohol delivered to the engine.

20. The engine of claim 19, wherein the preignition mitigation system includes a deactivation system to deactivate the cylinder detected having the preignition status; an accommodation system for shielding the cylinders not detected in the preignition status; and an indicator system to provide engine operation information based on the detection of the cylinder having the preignition status.

* * * * *